United States Patent
Kobayashi et al.

(10) Patent No.: US 10,122,012 B2
(45) Date of Patent: Nov. 6, 2018

(54) POSITIVE ELECTRODE ACTIVE MATERIAL FOR LITHIUM-ION BATTERY, A POSITIVE ELECTRODE FOR LITHIUM-ION BATTERY, AND LITHIUM-ION BATTERY

(71) Applicant: JX Nippon Mining & Metals Corporation, Chiyoda-ku, Tokyo (JP)

(72) Inventors: Shunsuke Kobayashi, Kitaibaraki (JP); Yoshio Kajiya, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 340 days.

(21) Appl. No.: 15/131,362

(22) Filed: Apr. 18, 2016

(65) Prior Publication Data

US 2016/0233503 A1    Aug. 11, 2016

Related U.S. Application Data

(63) Continuation of application No. 13/816,822, filed as application No. PCT/JP2011/066722 on Jul. 22, 2011, now abandoned.

(30) Foreign Application Priority Data

Dec. 3, 2010   (JP) ................................. 2010-270591

(51) Int. Cl.
| | |
|---|---|
| H01M 4/485 | (2010.01) |
| H01M 4/04 | (2006.01) |
| H01M 10/0525 | (2010.01) |
| H01M 4/525 | (2010.01) |

(52) U.S. Cl.
CPC ......... *H01M 4/485* (2013.01); *H01M 4/0471* (2013.01); *H01M 4/525* (2013.01); *H01M 10/0525* (2013.01)

(58) Field of Classification Search
CPC ........... H01M 10/0525; H01M 4/0471; H01M 4/485; H01M 4/525
See application file for complete search history.

(56) References Cited

U.S. PATENT DOCUMENTS

| | | |
|---|---|---|
| 2,165,128 A | 7/1939 | Cheesman |
| 4,443,186 A | 4/1984 | Shell |
| 4,462,793 A | 7/1984 | Maeda et al. |
| 4,469,654 A | 9/1984 | Haskett et al. |
| 5,393,622 A | 2/1995 | Nitta et al. |
| 5,449,577 A | 9/1995 | Dahn et al. |
| 5,478,674 A | 12/1995 | Miyasaka |
| 5,759,714 A | 6/1998 | Matsufuji et al. |
| 6,037,095 A | 3/2000 | Miyasaka |
| 6,040,090 A | 3/2000 | Sunagawa et al. |
| 6,123,911 A | 9/2000 | Yamaguchi et al. |
| 6,423,447 B1 | 7/2002 | Ohsaki et al. |
| 6,521,379 B2 | 2/2003 | Nishida et al. |
| 6,582,854 B1 | 6/2003 | Qi et al. |
| 6,919,144 B2 | 7/2005 | Miyazaki et al. |
| 6,960,335 B1 | 11/2005 | Singhal et al. |
| 6,984,469 B2 | 1/2006 | Kweon et al. |
| 7,332,248 B2 | 2/2008 | Kase et al. |
| 7,410,728 B1 | 8/2008 | Fujimoto et al. |
| 7,556,655 B2 | 7/2009 | Dahn et al. |
| 7,645,542 B2 | 1/2010 | Kase et al. |
| 7,799,458 B2 | 9/2010 | Nishida et al. |
| 7,935,443 B2 | 5/2011 | Ohzuku et al. |
| 8,354,191 B2 | 1/2013 | Shizuka et al. |
| 8,623,551 B2 | 1/2014 | Kawahashi et al. |
| 8,748,041 B2 | 6/2014 | Satoh et al. |
| 8,993,160 B2 | 3/2015 | Nagase |
| 9,090,481 B2 | 7/2015 | Satoh |
| 9,118,076 B2 | 8/2015 | Kajiya et al. |
| 9,214,676 B2 | 12/2015 | Okamoto |
| 9,216,913 B2 | 12/2015 | Okamoto et al. |
| 9,221,693 B2 | 12/2015 | Kawahashi et al. |
| 9,224,514 B2 | 12/2015 | Okamoto |
| 9,224,515 B2 | 12/2015 | Okamoto |
| 9,225,020 B2 | 12/2015 | Okamoto et al. |
| 9,231,249 B2 | 1/2016 | Kajiya et al. |
| 9,240,594 B2 | 1/2016 | Okamoto et al. |

(Continued)

FOREIGN PATENT DOCUMENTS

| | | |
|---|---|---|
| CN | 1520621 A | 8/2004 |
| CN | 1701451 A | 11/2005 |

(Continued)

OTHER PUBLICATIONS

Machine Translation of: JP 2007-257890 A, Ito et al., Oct. 4, 2007.*
Office Action dated Oct. 2, 2014 in co-pending U.S. Appl. No. 13/582,089.
Final Rejection dated Feb. 12, 2015 in co-pending U.S. Appl. No. 13/582,089.
Office Action dated Oct. 3, 2014 in co-pending U.S. Appl. No. 13/581,730.
Final Rejection dated Feb. 27, 2015 in co-pending U.S. Appl. No. 13/581,730.
Office Action dated Jul. 17, 2013 in abandoned U.S. Appl. No. 13/581,814.
Final Rejection dated Jan. 27, 2014 in abandoned U.S. Appl. No. 13/581,814.
Office Action dated Mar. 18, 2015 in co-pending U.S. Appl. No. 13/816,822.

(Continued)

*Primary Examiner* — Kenneth J Douyette
(74) *Attorney, Agent, or Firm* — Nields, Lemack & Frame, LLC

(57) ABSTRACT

The present invention provides a positive electrode active material for lithium ion batteries having excellent battery property.
The positive electrode active material for lithium ion batteries is represented by composition formula: $Li_xNi_{1-y}M_yO_{2+\alpha}$, wherein
M is Co as an essential component and at least one species selected from a group consisting of Sc, Ti, V, Cr, Mn, Fe, Cu, Zn, Ga, Ge, Al, Bi, Sn, Mg, Ca, B and Zr, $0.9 \leq x \leq 1.2$, $0 < y \leq 0.7$, $\alpha > 0.05$, and
an average particle size (D50) is 5 µm to 15 µm.

6 Claims, No Drawings

(56) References Cited

U.S. PATENT DOCUMENTS

| | | |
|---|---|---|
| 9,263,732 B2 | 2/2016 | Nagase et al. |
| 9,327,996 B2 | 5/2016 | Kawahashi et al. |
| 2002/0106561 A1 | 8/2002 | Lee et al. |
| 2002/0168570 A1 | 11/2002 | Hampden-Smith et al. |
| 2003/0082448 A1 | 5/2003 | Cho et al. |
| 2003/0104279 A1 | 6/2003 | Miyazaki et al. |
| 2003/0126803 A1 | 7/2003 | Rosenflanz |
| 2003/0211391 A1 | 11/2003 | Cho et al. |
| 2004/0053134 A1 | 3/2004 | Ozaki et al. |
| 2004/0110063 A1 | 6/2004 | Uchitomi et al. |
| 2004/0126660 A1 | 7/2004 | Ohzuku et al. |
| 2004/0197658 A1 | 10/2004 | Kase et al. |
| 2005/0079416 A1 | 4/2005 | Ohzuku et al. |
| 2005/0142442 A1 | 6/2005 | Yuasa et al. |
| 2005/0158546 A1 | 7/2005 | Shizuka |
| 2006/0083989 A1 | 4/2006 | Suhara et al. |
| 2006/0121350 A1 | 6/2006 | Kajiya et al. |
| 2006/0122765 A1 | 6/2006 | Nakao et al. |
| 2006/0204849 A1 | 9/2006 | Saito et al. |
| 2006/0233696 A1 | 10/2006 | Paulsen et al. |
| 2006/0281005 A1 | 12/2006 | Cho et al. |
| 2007/0015058 A1 | 1/2007 | Takezawa et al. |
| 2007/0141469 A1 | 6/2007 | Tokunaga et al. |
| 2007/0202405 A1 | 8/2007 | Shizuka et al. |
| 2007/0248883 A1 | 10/2007 | Oda et al. |
| 2007/0298512 A1 | 12/2007 | Park et al. |
| 2008/0044736 A1 | 2/2008 | Nakura |
| 2008/0081258 A1 | 4/2008 | Kim et al. |
| 2009/0117464 A1 | 5/2009 | Cho et al. |
| 2009/0117469 A1 | 5/2009 | Hiratsuka et al. |
| 2009/0148772 A1 | 6/2009 | Kawasato et al. |
| 2009/0233176 A1 | 9/2009 | Kita et al. |
| 2009/0258296 A1 * | 10/2009 | Kawasato ............ H01M 4/131 429/223 |
| 2009/0286164 A1 | 11/2009 | Wada et al. |
| 2009/0289218 A1 | 11/2009 | Kajiya et al. |
| 2009/0299922 A1 | 12/2009 | Malcus et al. |
| 2009/0305136 A1 | 12/2009 | Yada et al. |
| 2010/0015514 A1 | 1/2010 | Miyagi et al. |
| 2010/0019194 A1 | 1/2010 | Fujiwara et al. |
| 2010/0112447 A1 | 5/2010 | Yamamoto et al. |
| 2010/0136412 A1 | 6/2010 | Watanabe |
| 2010/0143583 A1 | 6/2010 | Honda et al. |
| 2010/0183922 A1 | 7/2010 | Cho et al. |
| 2010/0196761 A1 | 8/2010 | Tatsumi et al. |
| 2010/0209757 A1 | 8/2010 | Ooyama et al. |
| 2010/0209771 A1 | 8/2010 | Shizuka et al. |
| 2010/0227222 A1 | 9/2010 | Chang et al. |
| 2011/0031437 A1 | 2/2011 | Nagase et al. |
| 2011/0033749 A1 | 2/2011 | Uchida et al. |
| 2011/0076558 A1 | 3/2011 | Miyazaki et al. |
| 2011/0250499 A1 | 10/2011 | Hiratsuka |
| 2012/0034525 A1 | 2/2012 | Satoh et al. |
| 2012/0183855 A1 | 7/2012 | Wohlfahrt-Mehrens et al. |
| 2012/0231342 A1 | 9/2012 | Satoh et al. |
| 2012/0231343 A1 | 9/2012 | Nagase et al. |
| 2012/0244434 A1 | 9/2012 | Nagase |
| 2012/0292562 A1 | 11/2012 | Kajiya et al. |
| 2012/0319036 A1 | 12/2012 | Kajiya et al. |
| 2012/0319037 A1 | 12/2012 | Kawahashi et al. |
| 2012/0319039 A1 | 12/2012 | Satoh |
| 2012/0319040 A1 | 12/2012 | Okamoto et al. |
| 2012/0321956 A1 | 12/2012 | Kawahashi et al. |
| 2012/0326080 A1 | 12/2012 | Okamoto et al. |
| 2012/0326098 A1 | 12/2012 | Satoh |
| 2012/0326099 A1 | 12/2012 | Satoh |
| 2012/0326101 A1 | 12/2012 | Satoh |
| 2012/0326102 A1 | 12/2012 | Satoh |
| 2013/0001463 A1 | 1/2013 | Okamoto et al. |
| 2013/0004849 A1 | 1/2013 | Satoh |
| 2013/0043428 A1 | 2/2013 | Kawahashi et al. |
| 2013/0108921 A1 | 5/2013 | Kase et al. |
| 2013/0143121 A1 | 6/2013 | Kobayashi et al. |
| 2013/0175470 A1 | 7/2013 | Kajiya et al. |
| 2013/0216913 A1 | 8/2013 | Tode et al. |
| 2013/0221271 A1 | 8/2013 | Nagase et al. |
| 2013/0316239 A1 | 11/2013 | Okamoto |
| 2013/0344386 A1 | 12/2013 | Kim et al. |
| 2014/0306152 A1 | 10/2014 | Okamoto |
| 2014/0339465 A1 | 11/2014 | Okamoto |
| 2014/0339466 A1 | 11/2014 | Okamoto |
| 2015/0123029 A1 | 5/2015 | Nagase et al. |
| 2015/0188134 A1 | 7/2015 | Kameyama et al. |

FOREIGN PATENT DOCUMENTS

| | | |
|---|---|---|
| CN | 1710735 A | 12/2005 |
| CN | 1947288 A | 4/2007 |
| CN | 101478044 A | 7/2009 |
| EP | 0794155 A1 | 9/1997 |
| EP | 0903796 A1 | 3/1999 |
| EP | 1244164 A1 | 9/2002 |
| EP | 1317008 A2 | 6/2003 |
| EP | 1391950 A1 | 2/2004 |
| EP | 1450423 A1 | 8/2004 |
| EP | 1742281 A1 | 1/2007 |
| EP | 2023426 A1 | 2/2009 |
| EP | 2207226 A1 | 7/2010 |
| EP | 2207227 A1 | 7/2010 |
| EP | 2219251 A1 | 8/2010 |
| EP | 2533333 A1 | 12/2012 |
| EP | 2544272 A1 | 1/2013 |
| JP | 4-328277 A | 11/1992 |
| JP | 6-275274 A | 9/1994 |
| JP | 7-29603 A | 5/1995 |
| JP | 7-211311 A | 8/1995 |
| JP | 8-138669 A | 5/1996 |
| JP | 8-213015 A | 8/1996 |
| JP | 9-82325 A | 3/1997 |
| JP | 9-120813 A | 5/1997 |
| JP | 9-270257 A | 10/1997 |
| JP | 10-83815 A | 3/1998 |
| JP | 10-116618 A | 5/1998 |
| JP | 10-188986 A | 7/1998 |
| JP | 10-206322 A | 8/1998 |
| JP | 10-208744 A | 8/1998 |
| JP | 10-302779 A | 11/1998 |
| JP | 10-321224 A | 12/1998 |
| JP | 10-334919 A | 12/1998 |
| JP | 11-16573 A | 1/1999 |
| JP | 11-67205 A | 3/1999 |
| JP | 11-273676 A | 10/1999 |
| JP | 11-292542 A | 10/1999 |
| JP | 11-307094 A | 11/1999 |
| JP | 11-345615 A | 12/1999 |
| JP | 2000-30693 A | 1/2000 |
| JP | 2000-72445 A | 3/2000 |
| JP | 2000-149945 A | 5/2000 |
| JP | 2000-215884 A | 8/2000 |
| JP | 2000-348721 A | 12/2000 |
| JP | 2001-110420 A | 4/2001 |
| JP | 2001-148249 A | 5/2001 |
| JP | 2001-223008 A | 8/2001 |
| JP | 2001-266851 A | 9/2001 |
| JP | 2002-63901 A | 2/2002 |
| JP | 2002-124261 A | 4/2002 |
| JP | 3276183 B2 | 4/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-289261 A | 10/2002 |
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003-048719 A | 2/2003 |
| JP | 2003-81637 A | 3/2003 |
| JP | 2003-151546 A | 5/2003 |
| JP | 2003-229129 A | 8/2003 |
| JP | 2004-6264 A | 1/2004 |
| JP | 2004-146374 A | 5/2004 |
| JP | 2004-172109 A | 6/2004 |
| JP | 2004-193115 A | 7/2004 |

(56) References Cited

FOREIGN PATENT DOCUMENTS

| | | |
|---|---|---|
| JP | 2004-214187 A | 7/2004 |
| JP | 3539223 B2 | 7/2004 |
| JP | 2004-227790 A | 8/2004 |
| JP | 2004-253169 A | 9/2004 |
| JP | 2004-273451 A | 9/2004 |
| JP | 2004-355824 A | 12/2004 |
| JP | 2004-356094 A | 12/2004 |
| JP | 2005-11713 A | 1/2005 |
| JP | 2005-44743 A | 2/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-225734 A | 8/2005 |
| JP | 2005-235624 A | 9/2005 |
| JP | 2005-243636 A | 9/2005 |
| JP | 2005-251700 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-019229 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-192547 A | 8/2008 |
| JP | 2008-266136 A | 11/2008 |
| JP | 2008-277106 A | 11/2008 |
| JP | 2008-282613 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 1020100060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/063838 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2011/122448 A1 | 10/2011 |
| WO | 2012/098724 A1 | 7/2012 |
| WO | 2012/132071 A1 | 10/2012 |
| WO | 2012/132072 A1 | 10/2012 |
| WO | 2012/157143 A1 | 11/2012 |

OTHER PUBLICATIONS

Final Rejection dated Jun. 24, 2015 in co-pending U.S. Appl. No. 13/816,822.
Office action dated Sep. 29, 2015 in co-pending U.S. Appl. No. 13/816,822.
Final rejection dated Jan. 20, 2016 in co-pending U.S. Appl. No. 13/816,822.
Office Action dated Apr. 3, 2015 in co-pending U.S. Appl. No. 13/822,447.
Final rejection dated Aug. 14, 2015 in co-pending U.S. Appl. No. 13/822,447.
Office Action dated Apr. 3, 2015 in co-pending U.S. Appl. No. 14/364,830.
Office action dated Sep. 8, 2015 in co-pending U.S. Appl. No. 14/364,830.
Final rejection dated Jan. 28, 2016 in co-pending U.S. Appl. No. 14/364,830.
Final rejection dated Mar. 2, 2017 in co-pending U.S. Appl. No. 14/416,797.
Notice of allowance dated Jan. 2, 2018 in co-pending U.S. Appl. No. 14/416,797.
Office action dated Sep. 27, 2016 in co-pending U.S. Appl. No. 14/416,797.
International Search Report dated Jun. 8, 2010 in co-pending PCT application No. PCT/JP2010/053443.
International Preliminary Report on Patentability dated Nov. 17, 2011 in co-pending PCT application No. PCT/JP2010/053443.
International Search Report dated May 24, 2011 in co-pending PCT application No. PCT/JP2011/053271.
International Preliminary Report on Patentability dated Sep. 26, 2013 in co-pending PCT application No. PCT/JP2011/053271.
International Search Report/Written Opinion dated Mar. 8, 2011 in co-pending PCT application No. PCT/JP2010/071723.
International Preliminary Report on Patentability dated Jul. 12, 2012 in co-pending PCT application No. PCT/JP2010/071723.
European communication dated Oct. 27, 2014 in co-pending European patent application No. EP 10839166.5.
International Search Report dated Jan. 24, 2012 in co-pending PCT application No. PCT/JP2011/072860.
International Preliminary Report on Patentability dated Oct. 10, 2013 in co-pending PCT application No. PCT/JP2011/072860.
European Communication dated Jan. 5, 2015 in co-pending European patent application No. 11842456.3.
International Search Report/Written Opinion dated Jan. 25, 2011 in co-pending PCT application No. PCT/JP2010/071724.
International Preliminary Report on Patentability dated Jul. 10, 2012 in co-pending PCT application No. PCT/JP2010/071724.
International Search Report dated Apr. 26, 2011 in co-pending PCT application No. PCT/JP2011/052394.
International Preliminary Report on Patentability dated Oct. 11, 2012 in co-pending PCT application No. PCT/JP2011/052394.
European communication dated May 9, 2014 in co-pending European patent application No. EP 11739870.1.

(56) References Cited

OTHER PUBLICATIONS

International Search Report dated May 10, 2011 in co-pending PCT application No. PCT/JP2011/052399.
International Preliminary Report on Patentability dated Oct. 11, 2012 in co-pending PCT application No. PCT/JP2011/052399.
International Search Report dated Nov. 15, 2011 in co-pending PCT application No. PCT/JP2011/069042.
International Preliminary Report on Patentability dated Aug. 1, 2013 in co-pending PCT application No. PCT/JP2011/069042.
European communication dated Nov. 5, 2014 in co-pending European patent application No. EP 11856183.6.
International Search Report/Written Opinion dated Jun. 7, 2011 in co-pending PCT application No. PCT/JP2011/054935.
International Preliminary Report on Patentability dated Oct. 11, 2012 in co-pending PCT application No. PCT/JP2011/054935.
Japanese Communication dated Oct. 1, 2013 in co-pending Japanese patent application No. JP 2012-503253.
International Search Report dated Jun. 7, 2011 in co-pending PCT application No. PCT/JP2011/054938.
International Preliminary Report on Patentability dated Nov. 22, 2012 in co-pending PCT application No. PCT/JP2011/054938.
Japanese Communication dated Oct. 1, 2013 in co-pending Japanese patent application No. JP 2012-503255.
International Search Report/Written Opinion dated May 17, 2011 in co-pending PCT application No. PCT/JP2011/054942.
International Preliminary Report on Patentability dated Oct. 2, 2012 in co-pending PCT application No. PCT/JP2011/054942.
European Communication dated Dec. 9, 2014 in co-pending European patent application No. 11750768.1.
Japanese communication dated Apr. 7, 2015 in co-pending Japanese patent application No. 2012-503258.
International Search Report/Written Opinion dated Jun. 7, 2011 in co-pending PCT application No. PCT/JP2011/054934.
International Preliminary Report on Patentability dated Oct. 11, 2012 in co-pending PCT application No. PCT/JP2011/054934.
Japanese Communication dated Oct. 1, 2013 in co-pending Japanese patent application No. JP 2012-503252.
European Communication dated Dec. 9, 2014 in co-pending European patent application No. 11750762.4.
International Search Report/Written Opinion dated May 17, 2011 in co-pending PCT application No. PCT/JP2011/054941.
International Preliminary Report on Patentability dated Oct. 2, 2012 in co-pending PCT application No. PCT/JP2011/054941.
International Search Report dated May 10, 2011 in co-pending PCT application No. PCT/JP2011/055111.
International Preliminary Report on Patentability dated Nov. 22, 2012 in co-pending PCT application No. PCT/JP2011/055111.
International Search Report/Written Opinion dated May 17, 2011 in co-pending PCT application No. PCT/JP2011/053710.
International Preliminary Report on Patentability dated Oct. 2, 2012 in co-pending PCT application No. PCT/JP2011/053710.
Chinese communication dated May 12, 2014 in co-pending Chinese patent application No. CN 201180008573.3.
International Search Report/Written Opinion dated May 24, 2011 in co-pending PCT application No. PCT/JP2011/054777.
International Preliminary Report on Patentability dated Oct. 2, 2012 in co-pending PCT application No. PCT/JP2011/054777.
European communication dated May 9, 2014 in co-pending European patent application No. EP 11750704.6.
International Search Report dated May 24, 2011 in co-pending PCT application No. PCT/JP2011/054781.
Written Opinion dated Jun. 24, 2011 in co-pending PCT application No. PCT/JP2011/054781.
International Preliminary Report on Patentability dated Oct. 11, 2012 in co-pending PCT application No. PCT/JP2011/054781.
European communication dated Aug. 5, 2015 in co-pending European patent application No. EP 11750707.9.
International Search Report/Written Opinion dated May 24, 2011 in co-pending PCT application No. PCT/JP2011/054779.

International Preliminary Report on Patentability dated Oct. 2, 2012 in co-pending PCT application No. PCT/JP2011/054779.
European communication dated May 22, 2014 in co-pending European patent application No. EP 11750705.3.
International Search Report dated Nov. 1, 2011 in corresponding PCT application No. PCT/JP2011/066722.
International Preliminary Report on Patentability dated Jun. 13, 2013 in corresponding PCT application No. PCT/JP2011/066722.
European communication dated May 6, 2014 in corresponding European patent application No. EP 11845955.1.
International Search Report dated Apr. 10, 2012 in co-pending PCT application No. PCT/JP2011/079535.
European Communication dated Feb. 17, 2015 in co-pending European patent application No. 11865511.7.
International Search Report dated Jun. 5, 2012 in co-pending PCT application No. PCT/JP2012/057974.
International Preliminary Report on Patentability dated Oct. 10, 2013 in co-pending PCT application No. PCT/JP2012/057974.
European communication dated Oct. 20, 2014 in co-pending European patent application No. EP 12763420.2.
Chinese Communication dated Jan. 12, 2015 in co-pending Chinese patent application No. 201280004477.6.
International Search Report dated Dec. 25, 2012 in co-pending PCT application No. PCT/JP2012/074263.
International Preliminary Report on Patentability dated Jul. 31, 2014 in co-pending PCT application No. PCT/JP2012/074263.
International Search Report dated Dec. 25, 2012 in co-pending PCT application No. PCT/JP2012/074266.
International Preliminary Report on Patentability dated Jul. 31, 2014 in co-pending PCT application No. PCT/JP2012/074266.
International Search Report dated Aug. 27, 2013 in co-pending PCT application No. PCT/JP2013/064941.
International Preliminary Report on Patentability dated Mar. 19, 2015 in co-pending PCT application No. PCT/JP2013/064941.
International Search Report dated Jan. 7, 2014 in co-pending PCT application No. PCT/JP2013/076598.
International Preliminary Report on Patentability dated Apr. 2, 2015 in co-pending PCT application No. PCT/JP2013/076598.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Journal of the The Electrochemical Society, vol. 151, No. 10, Sep. 2004, pp. A1707-A1711, "Comparison of Overcharge Behavior of AlPO4-Coated LiCoO2 and LiNi0.8Co0.1Mn0.1O2 Cathode Materials in Li-Ion Cells", Cho, et al.
Journal of The Electrochemical Society, 151 (11), 2004, pp, A1899-A1904, "Synthesis, Thermal, and Electrochemical Properties of AlPO4-Coated LiNi0.8Co0.1Mn0.1O2 Cathode Materials for Li-Ion Cell", Cho, et al.
Journal of the Electrochemical Society, 155 (3), 2008, pp. A239-A245, "Storage Characteristics of LiNi0.8Co0.1+xMn0.1-xO2 (x=0, 0.03, and 0.06) Cathode Materials for Lithium Ion Batteries", Eom, et al.
Journal of Power Sources, vol. 146, 2005, pp. 39-44, "Performance of LiNiCoO2 materials for advanced lithium-ion batteries", Itou, et al.
Ceramics International, vol. 35, No. 4, May 2009, pp. 1633-1639, "Fine-sized LiNi0.8Co0.15Mn0.05O2 cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of Lix(MnyNi1-y)Oz cathode powders prepared by spray pyrolysis", Ju, et al.
Journal of Power Sources, vol. 153, No. 2, Feb. 2006, pp. 345-349, "Improvement of 12V overcharge behavior of LiCoO2 cathode material by LiNi0.8Co0.1Mn0.1O2 addition in a Li-ion cell", Kim, et al.
Journal of Applied Electrochemistry, vol. 38, No. 5, Jan. 2008, pp. 613-617, "Comparative study of the preparation and electrochemical performance of LiNi1/2Mn1/2O2 electrode material for rechargeable lithium batteries", Lian, et al.

(56) References Cited

OTHER PUBLICATIONS

Int. J. Electrochem. Sci., vol. 4, 2009, pp. 1770-1778, "Improved High Rate Cycling of Li-rich Li(1.10)Ni(1/3)Co(1/3)Mn(1/3)O(2) Cathode for Lithium Batteries", Santhanam, et al.
Electrochimica Acta, vol. 51, 2006, pp. 5581-5586, "Preparation and electrochemical properties of LiCoO2-LiNi0.5Mn0.5O2-Li2MnO3 solid solutions with high Mn contents", Sun, et al.
Wikipedia, Karl Fischer Titration article, Waybackmachine.com snapshot dtd., Sep. 12, 2010, 2 pages.
Yamada, et al., "Synthesis and properties of LiNiO2 as cathode material for secondary batteries", Journal of Power Sources, vol. 54, No. 2, Apr. 1, 1995, pp. 209-213.
Whittingham, Stanley M., "Lithium Batteries and Cathode Materials", Chem. Rev. 2004, 104, 4271-4301.
Conceicao, et al., "Combustion synthesis of (LSCF) porous materials for application as cathode in IT-SOFC", Materials Research Bulletin 46 (2011) p. 308-314.
Vaisala Application Note, "Dew Point in Compressed Air—Frequently Asked Questions", 2013.
Office Action dated Dec. 4, 2013 in co-pending U.S. Appl. No. 13/508,880.
Final Rejection dated Jun. 18, 2014 in co-pending U.S. Appl. No. 13/508,880.
Office Action dated Feb. 25, 2015 in co-pending U.S. Appl. No. 13/508,880.
Final Rejection dated Jul. 29, 2015 in co-pending U.S. Appl. No. 13/508,880.
Office action dated Dec. 30, 2015 in co-pending U.S. Appl. No. 14/926,843.
Office Action-Restriction-dated Mar. 12, 2013 in co-pending U.S. Appl. No. 13/508,887.
Office Action dated Jun. 10, 2013 in co-pending U.S. Appl. No. 13/508,887.
Final Rejection dated Sep. 19, 2013 in co-pending U.S. Appl. No. 13/508,887.
Final Rejection dated Sep. 18, 2014 in co-pending U.S. Appl. No. 13/508,887.
Ofice Action dated Sep. 17, 2013 in co-pending U.S. Appl. No. 13/856,514.
Final Rejection dated Feb. 27, 2014 in co-pending U.S. Appl. No. 13/856,514.
Office Action dated Sep. 18, 2014 in co-pending U.S. Appl. No. 13/856,514.
Office Action dated Aug. 1, 2013 in abandoned U.S. Appl. No. 13/581,546.
Final Rejection dated Jan. 27, 2014 in abandoned U.S. Appl. No. 13/581,546.
Office Action dated Aug. 13, 2013 in abandoned U.S. Appl. No. 13/582,067.
Final Rejection dated Jan. 24, 2014 in abandoned U.S. Appl. No. 13/582,067.

* cited by examiner

POSITIVE ELECTRODE ACTIVE MATERIAL FOR LITHIUM-ION BATTERY, A POSITIVE ELECTRODE FOR LITHIUM-ION BATTERY, AND LITHIUM-ION BATTERY

This application is a continuation of U.S. patent application Ser. No. 13/816,822 filed Feb. 13, 2013, now abandoned, which is a 371 of PCT/JP2011/066722 filed Jul. 22, 2011, the disclosures of which are incorporated herewith by reference in its entirety.

TECHNICAL FIELD OF THE INVENTION

The present invention relates to a positive electrode active material for lithium ion batteries, a positive electrode for lithium ion batteries, and a lithium ion battery.

BACKGROUND OF THE INVENTION

In general, lithium-containing transition metal oxides are used for a positive electrode active material for lithium ion batteries. In particular, they are lithium cobaltate ($LiCoO_2$), lithium nickelate ($LiNiO_2$), lithium manganite ($LiMn_2O_4$) and the like. A conjugation of the lithium-containing transition metal oxides is proceeding in order to improve properties such as high volume, cycle characteristic, storage characteristic, decreased internal resistance, rate performance, and safety. Lithium ion batteries, for large-size equipment use such as automobile use and load leveling use, require properties different from those of the past mobile phone use and personal computer use.

Traditionally, various methods have been conducted for improving the rate performance. For example, patent document 1 discloses a manufacturing method of a positive electrode material for a lithium secondary battery characterized in that a lithium-nickel composite oxide having a composition of $Li_xNi_{1-y}M_yO_{2-\delta}$ ($0.8 \le x \le 1.3$, $0 < y \le 0.5$, M is at least one element selected from a group consisting of Co, Mn, Fe, Cr, V, Ti, Cu, Al, Ga, Bi, Sn, Zn, Mg, Ge, Nb, Ta, Be, B, Ca, Sc and Zr. $\delta$ is oxygen loss or oxygen excess, $-0.1 < \delta < 0.1$) is passed through a classifier to separate particles having large particle diameters from particles having small particle diameters by equilibrium separation particle size $D_h = 1$ to 10 μm, and the particles having large particle diameters are mixed with the particles having small particle diameters at weight ratios of 0:100 to 100:0, and the method can easily produce a positive electrode material for a lithium secondary battery having various balance of rate performance and capacity.

(Patent documents 1) Japanese Patent No. 4175026

SUMMARY OF THE INVENTION

The lithium-nickel composite oxide disclosed in Patent document 1 has excess oxygen in the composition formula, and there is still room for improvement as high-quality positive electrode active material for lithium ion batteries.

The present invention aims to provide a positive electrode active material for lithium ion batteries having excellent battery property.

The inventors have diligently studied and eventually have found out, there is a close correlation between amount of oxygen in the positive electrode active material and battery property. That is, they found out that excellent battery property can be provided especially when the amount of oxygen in the positive electrode active material is a certain value or more, and more excellent battery property can be provided by controlling average particle sizes of powder in the positive electrode active material having amount of oxygen, being a certain value or more.

The present invention, produced on the basis of the above findings, in one aspect, is a positive electrode active material for lithium ion batteries, represented by composition formula: $Li_xNi_{1-y}M_yO_{2+\alpha}$, wherein M is Co as an essential component and at least one species selected from a group consisting of Sc, Ti, V, Cr, Mn, Fe, Cu, Zn, Ga, Ge, Al, Bi, Sn, Mg, Ca, B and Zr, $0.9 \le x \le 1.2$, $0 < y \le 0.7$, $\alpha > 0.05$, and an average particle size (D50) is 5 μm to 15 μm. "D50" means a particle size corresponding to 50% in volume-based cumulative fractions.

The present invention is, in one embodiment, the positive electrode active material for lithium ion batteries where the average particle size (D50) is 7 μm to 13 μm.

The present invention is, in yet another embodiment, the positive electrode active material for lithium ion batteries, where M is at least one species selected from a group consisting of Mn and Co.

The present invention is, in yet another embodiment, the positive electrode active material for lithium ion batteries, where $\alpha > 0.15$.

The present invention is, in yet another embodiment, the positive electrode active material for lithium ion batteries, where $\alpha > 0.20$.

The present invention is, in yet another embodiment, the positive electrode active material for lithium ion batteries, where D90 is 20 μm or less in particle size distribution.

"D90" means a particle size corresponding to 90% in volume-based cumulative fractions.

The present invention, in another aspect, is a positive electrode for lithium ion batteries using the positive electrode active material for lithium ion batteries of the present invention.

The present invention, in yet another aspect, is a lithium ion battery using the positive electrode for lithium ion batteries of the present invention.

Advantageous Effect of the Invention

The present invention can provide a positive electrode active material for lithium ion batteries having excellent battery property.

DESCRIPTION OF THE PREFERRED EMBODIMENTS

[Structure of Positive Electrode Active Material for Lithium Ion Batteries]

As raw materials for positive electrode active material for lithium ion batteries of the present invention, various compounds useful for positive electrode active material for general positive electrode for lithium ion batteries can be used. In particular, it is preferable to use lithium-containing transition metal oxides such as lithium cobaltate ($LiCoO_2$), lithium nickelate ($LiNiO_2$) and lithium manganite ($LiMn_2O_4$). The positive electrode active material for lithium ion batteries of the present invention, produced by using such materials, is represented by composition formula: $Li_xNi_{1-y}M_yO_{2+\alpha}$, where M is Co as an essential component and at least one species selected from a group consisting of Sc, Ti, V, Cr, Mn, Fe, Cu, Zn, Ga, Ge, Al, Bi, Sn, Mg, Ca, B and Zr, $0.9 \le x \le 1.2$, $0 < y \le 0.7$, $\alpha > 0.05$. The lithium ratio to all metal amount in the positive electrode active material for lithium ion batteries is 0.9 to 1.2. This is because it is difficult to maintain stable crystal structure if the ratio is less than 0.9, and high volume of the battery cannot be secured if the ratio is more than 1.2.

Oxygen is contained excessively in the positive electrode active material for lithium ion batteries of the present invention such as a constituent of oxygen is indicated by $O_{2+\alpha}$ ($\alpha>0.05$) in the chemical formula as described above. Accordingly, in a lithium ion battery using the material, battery property such as capacity, rate performance and capacity retention rate can be excellent. Further, calcination in the manufacturing process can be adequately conducted because oxygen is contained excessively. Accordingly, particle configuration and size are uniformized. With regard to $\alpha$, $\alpha>0.15$ is preferable and $\alpha>0.20$ is more preferable.

The positive electrode active material for lithium ion batteries consists of primary particles, secondary particles formed by aggregation of the primary particles or mixture of the primary particles and the secondary particles. An average particle size (D50) of primary particles, secondary particles formed by aggregation of the primary particles or mixture of the primary particles and the secondary particles is 5 μm to 15 μm. When the average particle size (D50) is 5 μm to 15 μm, powder in which a variability of size is inhibited can be produced. Accordingly, it is possible to apply the active material uniformly in the manufacturing process of an electrode of the lithium ion battery, and further, it is possible to inhibit a variability of composition of the electrode. Therefore, rate performance and cycle performance can be excellent when the electrode is used for the lithium ion battery. The average particle size (D50) is preferably 13 μm or less, more preferably 7 μm to 13 μm.

In the positive electrode active material for lithium ion batteries of the present invention, D90 is 20 μm or less in particle size distribution. When D90 is 20 μm or less, reaction variability among the particles decreases and then rate performance and cycle performance become more excellent. D90 is preferably 13 μm to 20 μm.

[Structure of Positive Electrode for Lithium Ion Batteries and Lithium Ion Battery using the Same]

The positive electrode for lithium ion batteries of the present invention has a structure, for example, where positive electrode combination agent, prepared by mixing the positive electrode active material for lithium ion batteries having the above described structure, conductivity auxiliary agent and binder, is applied on one surface or both surfaces of a current collector made of aluminum foil and the like. The lithium ion battery of the embodiment of the present invention has the positive electrode for lithium ion batteries having the above described structure.

[Manufacturing Method for Positive Electrode Active Material for Lithium Ion Batteries]

Next, manufacturing method for positive electrode active material for lithium ion batteries of the embodiment of the present invention is explained in detail. First, metal salt solution is produced. The metal is Ni and at least one species selected from a group consisting of Sc, Ti, V, Cr, Mn, Fe, Co, Cu, Zn, Ga, Ge, Al, Bi, Sn, Mg, Ca, B and Zr. The metal salt is sulfate, chloride, nitrate, acetate and the like. In particular, nitrate is preferable because nitrate can be directly calcined and therefore cleaning process can be omitted when nitrate is mixed in raw material for calcination as impurities, and nitrate acts as an oxidant to promote oxidation of metals in the raw material for calcination. Each metal contained in the metal salt is prepared such that it has a desired molar ratio. In this way, molar ratio of each metal in the positive electrode active material is determined.

Next, lithium carbonate is suspended in pure water, and then metal salt solution of the above metal is poured to produce metal carbonate solution slurry. At this time, microparticles of lithium-containing carbonate precipitate in the slurry. When the lithium compounds do not react at heat treatment as with sulfate, chloride and the like as metal salt, they are cleaned by saturated lithium carbonate solution and then filtered. When the lithium compounds react at heat treatment as with nitrate and acetate, as the lithium raw material, they are not cleaned but directly filtered. Then they are dried and then they can be used as precursor of calcination.

Next, the filtered lithium-containing carbonate is dried and then powder of lithium salt complex (precursor for positive electrode active material for lithium ion batteries) is provided.

Next, the powder of the precursor for positive electrode active material for lithium ion batteries, provided by drying, is classified to provide only powder having the particle size of 1 μm to 30 μm by using a sifter or a commercially available classification apparatus and the like.

Next, a calcination holder, having a predetermined content, is prepared. Precursor for positive electrode active material for lithium ion batteries, having the particle size of 1 μm to 30 μm, is filled in the calcination holder. Next, the calcination holder, filled with powder of precursor for positive electrode active material for lithium ion batteries, is moved to a calcination furnace and then calcined. The calcination is conducted by heat preservation for predetermined time under oxygen atmosphere. Further, it is preferable to conduct the calcination under increased pressure of 101 KPa to 202 KPa because amount of oxygen in the composition increases.

After that, the powder is taken from the calcination holder and then powder of positive electrode active material is provided by pulverization with commercially available pulverization apparatus and the like. The pulverization is conducted by controlling pulverization power and pulverization time accordingly, to provide desired median diameter and repose angle.

EXAMPLES

Examples of the present invention will be described as follows, but the following examples are provided for better understanding of the present invention and its advantages, and intended to be non-limiting.

Working Examples 1 to 15

At first, lithium carbonate, the amount of which is described in Table 1, was suspended in 3.2 L of pure water and then 4.8 L of metal salt solution was poured. The metal salt solution was prepared such that the composition ratio of each metal became the value described in Table 1 with regard to each hydrate of nitrate and all molar number of the metals became 14 mol.

Suspension amount of lithium carbonate was such that a product (positive electrode material for lithium ion batteries, that is, positive electrode active material) was $Li_x(Ni_{1-y}M_y)O_{2+\alpha}$, where x is described in Table 1, and each of the amount was respectively calculated by the following formula.

$$W(g)=73.9\times14\times(1+0.5X)\times A$$

In the above formula, "A" is a value to be multiplied in order to subtract the amount of lithium in lithium compound other than lithium carbonate remaining in raw materials after filtration, in addition to needed volume for precipitation reaction, from the suspension amount beforehand. "A" is 0.9 when lithium salt reacts as raw material of calcination as with nitrate and acetate. "A" is 1.0 when lithium salt does not react as raw material of calcination as with sulfate and chloride.

Microparticles of lithium-containing carbonate precipitated in the solution by the treatment. Then the precipitate was filtered by using a filter press. Next, the precipitate was dried and then the lithium-containing carbonate (precursor for positive electrode active material for lithium ion batteries) was produced.

Next, the lithium-containing carbonate, provided by drying, was classified to provide powder having the particle size of 1 μm to 30 μm by using a sifter. Next, a calcination holder was prepared and then filled with the lithium-containing carbonate. Then the calcination holder was set in an oxygen atmosphere furnace at atmospheric pressure, heat preservation was conducted for 10 hours at the calcination temperature described in Table 1, and then oxides were provided by cooling.

Next, the provided oxides were pulverized to 5 μm to 15 μm of the average particle size with a compact pulverization apparatus (HOSOKAWA MICRON ACM-2EC), and then powder of positive electrode active materials for lithium ion batteries were provided.

Working Example 16

With regard to working example 16, composition of each metal of raw materials is shown in Table 1, metal salt was chloride. After precipitating lithium-containing carbonate, washing treatment was conducted by saturated lithium carbonate solution and then filtration treatment was conducted. Other than that, treatments similar to working examples 1 to 15 were conducted.

Working Example 17

With regard to working example 17, composition of each metal of raw materials is shown in Table 1, metal salt was sulfate. After precipitating lithium-containing carbonate, washing treatment was conducted by saturated lithium carbonate solution and then filtration treatment was conducted. Other than that, treatments similar to working examples 1 to 15 were conducted.

Working Example 18

With regard to working example 18, composition of each metal of raw materials is shown in Table 1. Calcination treatment was conducted under increased pressure of 120 KPa instead of conducting under atmosphere pressure. Other than that, treatments similar to working examples 1 to 15 were conducted.

Comparative Examples 1 to 3

With regard to comparative examples 1 to 3, composition of each metal of raw materials is shown in Table 1, classification after drying the precursor was not conducted, and the last pulverization of oxides was conducted such that the average particle size became 5 μm or less, or 20 μm or more. Other than that, treatments similar to working examples 1 to 15 were conducted.

Comparative Examples 4 to 7

With regard to comparative examples 4 to 7, composition of each metal of raw materials is shown in Table 1. Calcination treatment was conducted in an air atmosphere furnace instead of conducting in an oxygen atmosphere furnace. Other than that, treatments similar to comparative example 1 were conducted.

[Evaluation]

—Evaluation of Composition of Positive Electrode Material—

Contained amounts of metal in the positive electrode material were measured by Inductively Coupled Plasma—Optical Emission Spectrometer (ICP-OES) and then composition ratio (molar ratio) of each metal was calculated, and it was confirmed that they resulted in the values described in Table 1. Further, oxygen content was measured by LECO method and a was calculated.

—Evaluations of Average Particle Size (D50) and D90—

Powders of each positive electrode material were taken and D50 and D90 were measured by Laser Diffraction Particle Size Analyzer (SHIMADZU: SALD-3000).

—Evaluation of Battery Property—

The positive electrode active material, an electrical conducting material and a binder were weighed in a proportion of 85:8:7. Next, the positive electrode active material and the electrical conducting material were mixed in an organic solvent (N-methylpyrrolidone) where the binder dissolved, and then slurry was produced. Next, the slurry was applied to aluminum foil, and then a positive electrode was produced by pressing after drying the slurry.

Next, 2032-type coin cell for evaluation, where the other electrode was Li, was produced and discharged capacity when current density was 0.2 C, was measured by using an electrolyte where 1M-LiPF$_6$ was dissolved in EC-DMC (1:1). Further, a ratio of the discharged capacity when current density was 2 C, to a battery capacity when current density was 0.2 C, was calculated and then a rate performance was provided. Further, capacity retention rate was measured by comparing an initial discharged capacity provided with 1 C of discharge current at room temperature with a discharged capacity after 100 cycles. The results are shown in Table 1.

TABLE 1

| | suspension amount of lithium carbonate(g) | composition ratio of each metal in all metals except Li | | | | | | | | |
|---|---|---|---|---|---|---|---|---|---|---|
| | | Ni | Co | Mn | Ti | Cr | Fe | Cu | Al | Sn |
| Working example 1 | 1393 | 33.3 | 33.3 | 33.3 | | | | | | |
| Working example 2 | 1393 | 33.3 | 33.3 | 33.3 | | | | | | |
| Working example 3 | 1393 | 33.3 | 33.3 | 33.3 | | | | | | |

TABLE 1-continued

| | | | | | | | | | |
|---|---|---|---|---|---|---|---|---|---|
| Working example 4 | 1393 | 33.3 | 33.3 | 33.3 | | | | | |
| Working example 5 | 1393 | 33.3 | 33.3 | 33.3 | | | | | |
| Working example 6 | 1393 | 33.3 | 33.3 | 33.3 | | | | | |
| Working example 7 | 1350 | 33.3 | 33.3 | 33.3 | | | | | |
| Working example 8 | 1490 | 33.3 | 33.3 | 33.3 | | | | | |
| Working example 9 | 1393 | 33 | 33 | 33 | | | | | 1 |
| Working example 10 | 1393 | 80 | 10 | 10 | | | | | |
| Working example 11 | 1393 | 80 | 15 | | 2.5 | | | | |
| Working example 12 | 1393 | 80 | 15 | | | 5 | | | |
| Working example 13 | 1393 | 80 | 15 | | | | 5 | | |
| Working example 14 | 1393 | 80 | 15 | | | | | 5 | |
| Working example 15 | 1393 | 80 | 15 | | | | | | 5 |
| Working example 16 | 1393 | 33.3 | 33.3 | 33.3 | | | | | |
| Working example 17 | 1393 | 33.3 | 33.3 | 33.3 | | | | | |
| Working example 18 | 1393 | 33.3 | 33.3 | 33.3 | | | | | |
| Comparative example 1 | 1393 | 33.3 | 33.3 | 33.3 | | | | | |
| Comparative example 2 | 1393 | 33.3 | 33.3 | 33.3 | | | | | |
| Comparative example 3 | 1393 | 80 | 10 | 10 | | | | | |
| Comparative example 4 | 1393 | 33.3 | 33.3 | 33.3 | | | | | |
| Comparative example 5 | 1393 | 80 | 10 | 10 | | | | | |
| Comparative example 6 | 1393 | 80 | 15 | | | | | | 5 |
| Comparative example 7 | 1393 | 80 | 15 | | 2.5 | | | | |

| | composition ratio of each metal in all metals except Li Mg | holding temperature (° C.) | x | α | average particle size (D50) (μm) | D90 (μm) | discharged capacity (mAh/g) | rate performance (%) | capacity retention rate (%) |
|---|---|---|---|---|---|---|---|---|---|
| Working example 1 | | 1000 | 1.00 | 0.13 | 5.5 | 10.2 | 153 | 92 | 90 |
| Working example 2 | | 1000 | 1.00 | 0.12 | 8.1 | 15.1 | 154 | 92 | 91 |
| Working example 3 | | 1000 | 1.00 | 0.12 | 11.3 | 17.6 | 155 | 92 | 92 |
| Working example 4 | | 1000 | 1.00 | 0.12 | 14.3 | 19.8 | 154 | 91 | 91 |
| Working example 5 | | 970 | 1.00 | 0.16 | 10.8 | 17.5 | 155 | 95 | 92 |
| Working example 6 | | 950 | 1.00 | 0.18 | 10.0 | 16.9 | 155 | 95 | 92 |
| Working example 7 | | 1000 | 0.90 | 0.11 | 10.6 | 17.3 | 160 | 91 | 88 |
| Working example 8 | | 1000 | 1.20 | 0.14 | 11.4 | 18.5 | 150 | 95 | 92 |
| Working example 9 | | 1000 | 1.00 | 0.13 | 13.0 | 19.6 | 153 | 93 | 90 |
| Working example 10 | | 750 | 1.00 | 0.15 | 10.0 | 17.2 | 195 | 90 | 85 |
| Working example 11 | 2.5 | 750 | 1.00 | 0.16 | 7.6 | 15.1 | 190 | 87 | 85 |
| Working example 12 | | 750 | 1.00 | 0.18 | 7.8 | 15.4 | 187 | 87 | 84 |
| Working example 13 | | 750 | 1.00 | 0.17 | 8.2 | 15.5 | 180 | 85 | 82 |
| Working example 14 | | 750 | 1.00 | 0.17 | 7.9 | 15.3 | 190 | 89 | 82 |
| Working example 15 | | 750 | 1.00 | 0.15 | 7.8 | 15.3 | 178 | 85 | 82 |
| Working example 16 | | 1000 | 1.00 | 0.10 | 12.0 | 19.3 | 153 | 91 | 90 |
| Working example 17 | | 1000 | 1.00 | 0.11 | 12.4 | 19.2 | 152 | 91 | 90 |
| Working example 18 | | 950 | 1.00 | 0.21 | 9.8 | 17.1 | 155 | 95 | 93 |
| Comparative example 1 | | 1000 | 1.00 | 0.18 | 4.2 | 9.2 | 153 | 92 | 88 |
| Comparative example 2 | | 1000 | 1.00 | 0.13 | 23.5 | 30.7 | 154 | 89 | 88 |
| Comparative example 3 | | 750 | 1.00 | 0.15 | 27.5 | 34.2 | 180 | 75 | 77 |
| Comparative example 4 | | 1100 | 1.00 | −0.02 | 14.8 | 19.9 | 148 | 89 | 83 |
| Comparative example 5 | | 750 | 1.00 | 0.00 | 10.5 | 17.6 | 170 | 77 | 77 |
| Comparative example 6 | | 750 | 1.00 | −0.01 | 8.2 | 15.0 | 165 | 75 | 73 |
| Comparative example 7 | 2.5 | 750 | 1.00 | 0.00 | 8.5 | 15.3 | 170 | 79 | 72 |

What is claimed is:

1. A manufacturing method for a positive electrode active material for lithium ion batteries, represented by composition formula: $Li_xNi_{1-y}M_yO_{2+\alpha}$, wherein M is Co as an essential component and at least one species selected from a group consisting of Sc, Ti, V, Cr, Mn, Fe, Cu, Zn, Ga, Ge, Al, Bi, Sn, Mg, Ca, B and Zr, $0.9 \leq x \leq 1.2$, $0 < y \leq 0.7$, $\alpha > 0.05$, and an average particle size (D50) is 5 μm to 15 μm, comprising the steps of (1) to (5):

(1) producing metal salt solution of Ni and at least one species selected from a group consisting of Sc, Ti, V, Cr, Mn, Fe, Co, Cu, Zn, Ga, Ge, Al, Bi, Sn, Mg, Ca, B and Zr, (2) suspending lithium carbonate in pure water, and then pouring the metal salt solution in the water to produce metal carbonate solution slurry, (3) filtering the metal carbonate solution slurry to produce a filtered lithium-containing carbonate, and then drying the lithium-containing carbonate to produce powders of a precursor for positive electrode active material for lithium ion batteries, (4) classifying the powders of a precursor for positive electrode active material for lithium ion batteries to produce powders having a particle size of 1 μm to 30 μm, and (5) conducting a calcination of the powders of a precursor for positive electrode active material for lithium ion batteries having a particle size of 1 μm to 30 μm to produce a positive electrode active material for lithium ion batteries.

2. The manufacturing method of claim 1, wherein the average particle size (D50) is 7 μm to 13 μm.

3. The manufacturing method of claim 1, wherein M is Co and Mn.

4. The manufacturing method of claim 1, wherein $\alpha > 0.15$.
5. The manufacturing method of claim 4, wherein $\alpha > 0.20$.
6. The manufacturing method of claim 1, wherein D90 is 20 μm or less in particle size distribution.

* * * * *